United States Patent [19]

Plank et al.

[11] Patent Number: 4,476,718
[45] Date of Patent: Oct. 16, 1984

[54] RAIN RATE METER

[75] Inventors: Vernon G. Plank, Mansfield; Stephen D. Crist, Burlington; Dennis L. LaGross, Bedford, all of Mass.

[73] Assignee: The United States of America as represented by the Secretary of the Air Force, Washington, D.C.

[21] Appl. No.: 482,754

[22] Filed: Apr. 7, 1983

[51] Int. Cl.³ .................................................. G01W 1/14
[52] U.S. Cl. ........................................ 73/171; 177/189; 73/861
[58] Field of Search ................... 73/861, 223, 171, 296; 177/184, 187, 189

[56] References Cited

U.S. PATENT DOCUMENTS

| | | | |
|---|---|---|---|
| 417,357 | 12/1889 | Fergusson | 73/171 |
| 2,789,431 | 4/1957 | Wong | 73/171 |
| 2,964,943 | 12/1960 | Anderson | 73/171 |
| 3,372,586 | 3/1968 | Chadwick | 73/171 |

Primary Examiner—Herbert Goldstein
Attorney, Agent, or Firm—Donald J. Singer; Jacob N. Erlich

[57] ABSTRACT

A rain rate meter for delineating short-term variations in rain rate having a housing which encloses an electronic balance sensitive to approximately 0.01 grams. The top of the housing is open and has a funnel-shaped element located therein for receiving rainfall. An outlet port is centrally located at the bottom of the funnel-shaped element and a dispersing means is positioned adjacent the outlet port for substantially eliminating the adverse effects of the downward momentum of the rain water flowing from the outlet port prior to being collected by a container which rests upon the balance in the housing. A transfer mechanism is situated in the container in order to gently deposit the flowing rain water into the container. Measurements of collected rainfall weight are made over a preselected period of time by the electronic balance in order to accurately ascertain rain rate.

14 Claims, 8 Drawing Figures

RAIN RATE METER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to rain rate meters, and, more particularly, to a rain rate meter which is capable of reliably delineating short-term variations in rain rate.

Many storm situations produce unexpected, localized "shafts" of severe/heavy concentrations of rain fall. Measurements taken during rain storms have shown that factors of two in rain rate variability within a matter of seconds are not uncommon. In fact, these types of measurements are consistent even in wide spread range situations, not just in severe or heavy rain scenarios. Preliminary studies indicate that areas of heavier rainfall, up to several hundreds of meters in diameter, are imbedded within storms and that these localized "shafts" of rainfall are continuously in a state of change, thus, they will form, grow while moving with the prevailing winds, and then dissipate. Consequently, their numbers, sizes and intensities are as unpredictable as their existence is predictable. For example, the effects of such heavy, localized "shafts" of severe concentrations of rainfall on the attenuation of electro-optical and communication systems and the landing or takeoff of aircraft are of particular concern.

It has long been recognized that electro-optical and communication systems are especially susceptible to attenuation because of severe/heavy rain rates. Therefore, it becomes extremely important to quickly analyze such rain rates, or the amount of rain deposited on a surface in a given amount of time. By analyzing this information, it is possible to determine the rate of such falling rain. Accordingly, steps may then be taken to lessen the attenuation effects caused by such rainfall.

In addition, studies have raised the possibility that heavy rain could be a contributing factor in a number of aircraft accidents. A sufficient amount of water striking a flying aircraft can cause a significant decrease in aerodynamic lift, increase in weight, increase in drag from the force of the raindrops striking the aircraft, and the possibility of malfunction of the aircraft engine. Since an aircraft, especially when landing or taking off, is especially vulnerable to external conditions that can alter its aerodynamic efficiency, one can easily postulate the results of such severe/heavy rainfall if a fully loaded aircraft passes through a "shaft" of severe rain at a critical point during approaching or leaving an airfield.

Heretofore, conventional tipping bucket gauges have been utilized to ascertin rain rates. Unfortunately, these types of gauges, although acceptable for rain rates from between 200 mm hr$^{-1}$ to 700 mm hr$^{-1}$, are ineffective at rain rates greater than 700 mm hr$^{-1}$. In fact, at rain rates greater than 700 mm hr$^{-1}$, water spillage encountered by conventional tipping bucket gauges begins to be a major problem, and at about 1,000 mm hr$^{-1}$, the tipping bucket type rain gauge fails completely and 100% spillage occurs or the bucket merely fibrilates without tipping.

Consequently, it is clearly evident that it would be highly desirable to provide a rain rate meter which is capable of providing data over a short term and which is highly accurate in either light or heavy rainfall scenarios..

SUMMARY OF THE INVENTION

The present invention overcomes the problems encountered in the past and as set forth in detail hereinabove by providing a rain rate meter which can effectively delineate short-term variations in rain rate.

The rain rate meter of the present invention is made up of a housing having an open funnel-shaped top surface into which the rainfall descends. Centrally located at the bottom of the funnel-shaped directing surface is an outlet port. Adjacent to the outlet port is a flat plate or disc which is interposed directly in the flow path of the collected rain. The flat plate is fastened to the exterior of the funnel-shaped directing surface and is slightly larger in diameter than the outlet port. This plate is used to destroy the downward momentum of the collected rain. Directly below this flat plate is a collection container. The container is placed upon the weighing pan of the remote head of an electronic balance sensitive to approximately 0.01 grams.

In addition, situated in the center of the collection container is a transfer mechanism. The transfer mechanism is used for the orderly transfer of rain water flowing from the outlet port of the funnel-shaped surface into the container. More specifically, this transfer mechanism is made up of a series of thin, conically-shaped, rigid, preferably plastic discs supported by a centrally located, upstanding rod. The discs are spaced a preselected distance apart from one another in order to form a series of steps in an overall conical configuration. Utilization of this arrangement allows the collected water to drop the small distance from the flat plate adjacent the outlet port onto the transfer mechanism where the weight is immediately recorded and then allowed to drop through a series of these small steps to the bottom of the collection container. Thus, the small step increments between the flat plate and the container bottom produces insufficient force to disturb the sensitive weight measurements made by the electronic balance. In the alternative, a cylindrical, sponge-like transfer element may be utilized in place of the baffle-like transfer mechanism described above.

The output from the remote sensing head of the electronic balance can then be either read directly or can be recorded on tape in a conventional manner for time-weight computer computation in order to determine rain rate information.

It is therefore an object of this invention to provide a rain rate meter which can electronically weigh naturally falling rain in order to determine rain rate information.

It is another object of this invention to provide a rain rate meter in which weight measurements at short intervals can be utilized in order to determine rain rate information.

It is a further object of this invention to provide a rain rate meter which is extremely accurate and which is at ieast an order of magnitude more sensitive than existing rain guages.

It is still a further object of this invention to provide a rain rate meter which produces data that can be conveniently converted into terms of rain rate.

It is still another object of this invention to provide a rain rate meter which is economical to produce and which utilizes conventional, currently available components that lend themselves to standard mass producing, manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

DETAILED DESCRIPTION OF THE PREFERRED EMBODIMENTS

Figure 1:
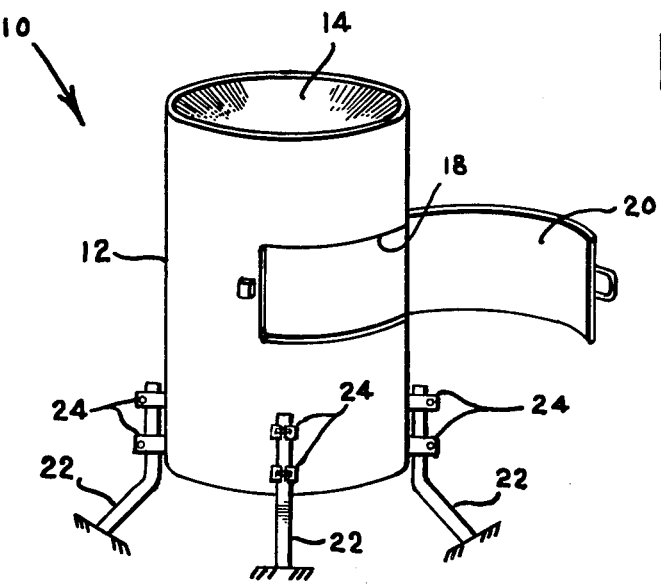
FIG. 1 is a pictorial representation of the rain rate meter of this invention.

Reference is now made to FIG. 1 of the drawing which pictorially illustrates the rain rate meter 10 of the present invention. Rain rate meter 10 includes a housing 12 preferably of cylindrical configuration having an open top 14 in which is formed a funnel-like element 16 more clearly illustrated in FIG. 2 of the drawing. In addition, housing 12 has a centrally located, elongated opening 18 for access to the interior thereof. During use and in inclement weather a hinged door 20 is utilized to cover opening 18. Housing 12 is supported by a plurality of outstanding legs 22 so that the rain rate meter 10 may be steadily positioned in the field during its use. In addition, if desirable legs 22 may be adjustable within a support arrangement 24 illustrated in FIGS. 1 and 2 of the drawing.

Figure 2:
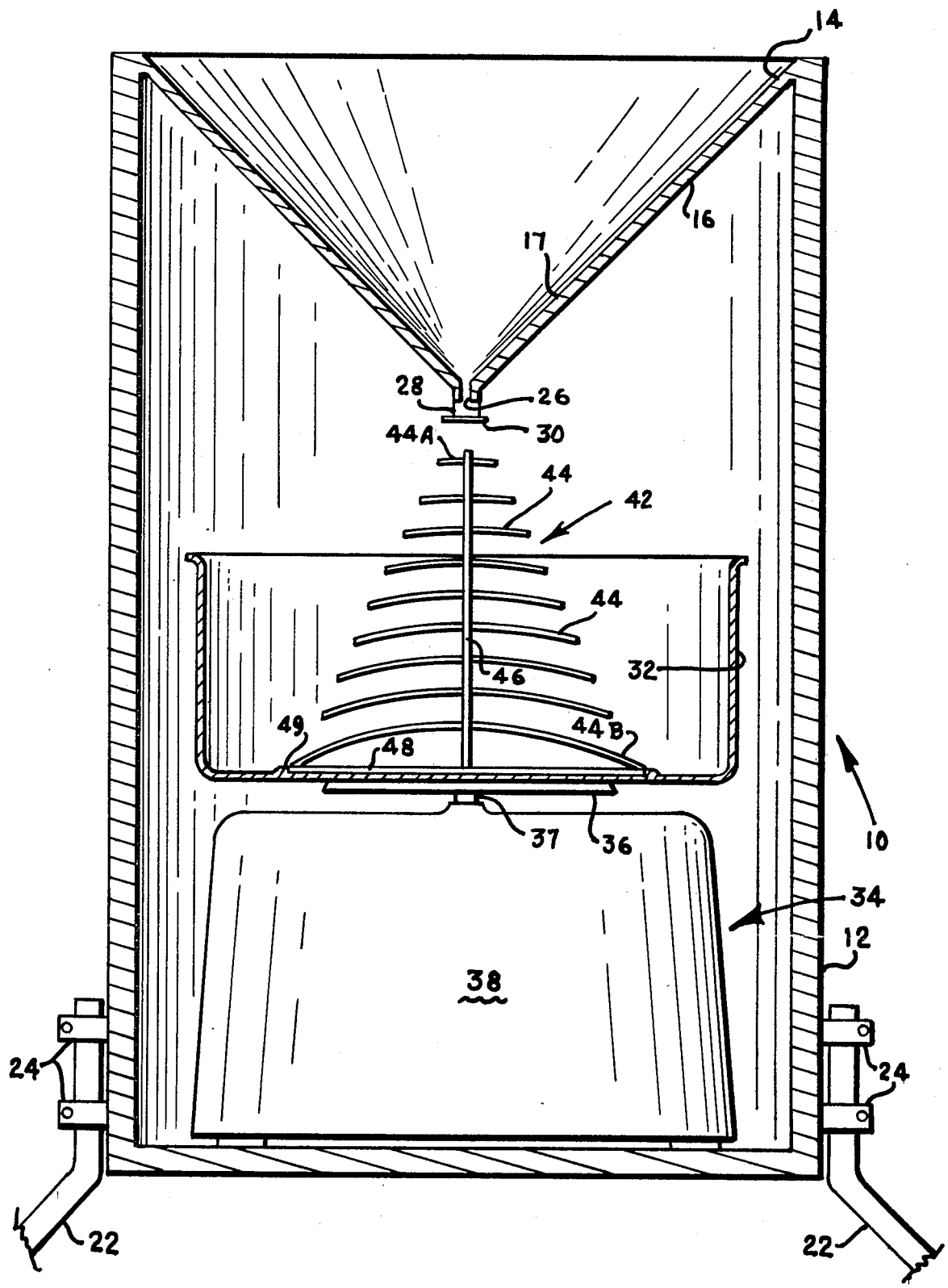
FIG. 2 is a side elevational view of the rain rate meter of this invention and shown partly in cross-section.

Reference is now made to FIG. 2 of the drawing which more clearly shows the interior of housing 12 and the major components making up rain rate meter 10 of this invention. As stated above, housing 12 has an open top 14 into which is positioned or fixedly secured to the cylindrical side walls of housing 12, the funnel-like element 16. Element 16 has a rain directing surface 17 which terminates at the bottom thereof in an outlet port 26.

Located adjacent outlet port 26 and fixedly secured to funnel-like element 16 by any suitable securing means such as a plurality of thin web-like support structures 28 is a horizontally positioned flat plate or disc 30, preferably made of metal or plastic. Disk 30 is spaced somewhat apart from port 26 so as to intercept the out flowing rainfall which has been directed by directing surface 17 through port 26. The purpose of disk or plate 30 is to disperse the flowing rain water and to substantially eliminate the adverse effects of the vertical momentum of the rain water flowing out of port 26. In so doing, plate 30 distributes the outflow water or rain in a substantially horizontal fashion so as to flow into a collection bucket or container 32.

Before describing in detail collection container 32 and its associated elements, it is necessary to describe the weighing device of the present invention. The weighing device is preferably in the form of an electronic remote balance unit 34 which is situated on the bottom surface of housing 12. A weighing pan 36 extends from a rod 37 formed as a part of electronic balance 34. Resting upon weighing pan 36 is the collection bucket or container 32. The electronic balance is of conventional design capable of providing sensitivity of approximately 0.01 grams. An example of such an electronic balance which incorporates therein a remote sensing head designated as element 38 in FIG. 2 of the drawing is Scientech Model 3340 Electronic Balance. As stated above, forming part of the electronic balance 34 is a movable rod or shaft 37 which operably interconnects, in a conventional manner, the remote sensing head 38 of balance 34 with the weighing pan 36.

Still referring to FIG. 2 of the drawing, a transfer mechanism 42 is removably positioned within the collection container 32 in order to receive the outflowing rain water being horizontally distributed by plate 30. Transfer mechanism 42 efficiently transfers this rain water into collection container 32 in as gradual and gentle a fashion as possible. Mechanism 42 allows for the rain water flowing from port 26 to drop the small distance from plate 30 onto the transfer mechanism 42 where the weight of the rain water is immediately recorded. From transfer mechanism 42 the rain water continues to gently drop into the collection container 32.

More specifically, transfer mechanism 42 is made up of a plurality or series of thin, preferably conically-shaped, plastic discs or plates 44 supported by centrally located outstanding support rod 46. Rod 46 is fixedly secured at one end thereof to a support plate 48 which is centrally located within a raised circular rib 49 formed in the bottom surface of collection container 32. Each of the series of discs 44 are of increasing diameter as the plates descend from the top disc 44A adjacent plate 30 to the bottom disc 44B. In addition, each of the discs 44 is slighly curved in a fashion to produce a convex surface facing the incoming rain water emanating from outlet port 26 and flat plate 30. Since discs 44 are disposed a preselected distance apart from one another, they form a series of small steps and are configured in an overall conical shape. The small step increments between adjacent discs 44 and the bottom of container 32 substantially reduces the force of the incoming rain so as not to adversely effect the sensitive weight measurements as the collected rain is weighed by the extremely sensitive electronic balance 34.

An external meter (not shown) can be operably connected to the remote sensing head 38 in order to instantaneously register weight measurements as the incoming rainfall deposits within collection container 32. If desired, however, the output from remote sensing head 38 can be recorded on a tape (not shown) for time-weight computer computation in order to determine rain rate information.

Figure 3:
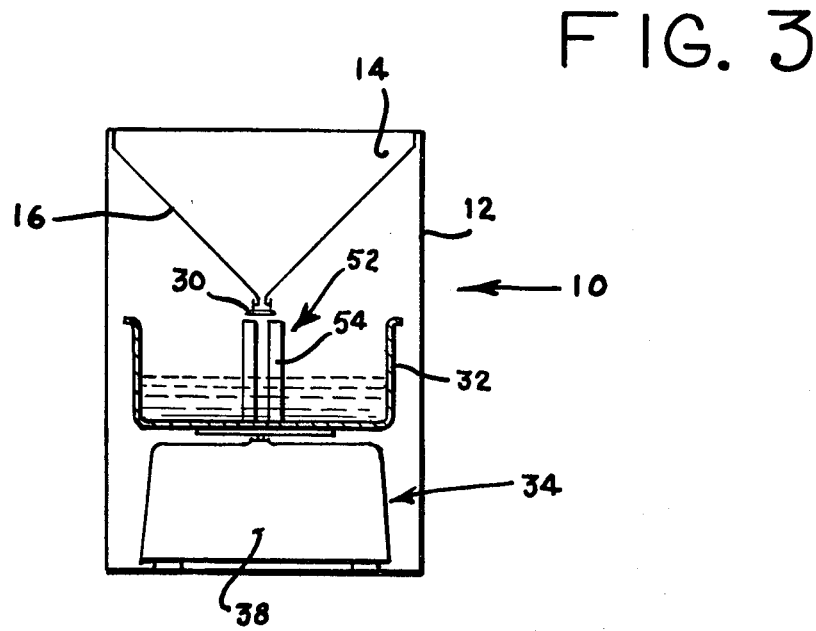
FIG. 3 is a side elevational view of an alternate embodiment of the transfer mechanism utilized with the rain rate meter of this invention and shown partly in cross-section.

An alternate embodiment of the present invention is illustrated in FIG. 3 of the drawing in which a different type of of transfer mechanism 52 is utilized within container 32 of rain rate meter 10 of the present invention. Since substantially all of the other elements illustrated in FIG. 2 and FIG. 3 of the drawing are identical to the elements illustrated in FIGS. 1 and 2 of the drawing, the same reference numerals will be used to designate the same elements in all Figures.

With reference to FIG. 3 of the drawing, transfer mechanism 52 is illustrated as being in the form of a cylindrically-shaped, sponge-like member 54 which is centrally located within collection container 32. Consequently, as the rainfall flows from port 26 onto plate 30 it will be absorbed by the sponge-like member 54. In this manner the weight of the rainfall can be instantaneously recorded by electronic balance 34. As with the transfer mechanism 42, illustrated in FIG. 2, transfer mechanism 52 provides for a gentle, gradual transfer of the water between plate 30 and collection container 32.

MODE OF OPERATION

To illustrate the the operation of the rain rate meter 10 of the present invention, it will be advantageous to describe typical rain rate data and to consider a situation of very small rain rate followed by considerations of heavy and medium rain rates.

As stated above, the basic weight resolution of the electronic balance 34 of rain rate meter 10 is 0.01 g. This weight corresponds to that of a single water drop of 2.67 mm diameter. A drop of this size will not, by itself, flow down the sides 17 of the funnel-like directing element 16. Instead it will adhere to the interior sides 17 of element 16 because of surface tension. It takes a collection of drops, or a "blob", to flow down the sides 17 of element 16 and out of port 26 and onto plate 30 for subsequent collection and weighing in container 32.

Figure 4:
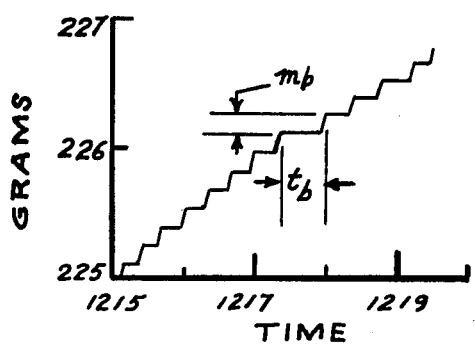
FIG. 4 is a graph representative of rain measurement showing weight versus time.
Figure 5:
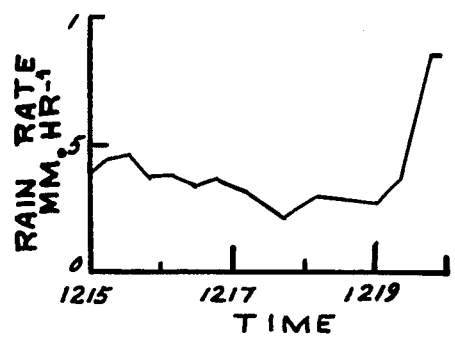
FIG. 5 is a graphic representation of rain measurement information deduced from the weight measurements illustrated graphically in FIG. 4.

More specifically, for small rain rates, smaller than about 3 mm hr$^{-1}$, the rain measurement situation is illustrated in FIGS. 4 and 5 of the drawing. FIG. 4 shows the weight increase trace. It is seen that the weights indicated by balance 34 increase in incremental steps which are separated by plateaus of no change therebetween. The weight increase increments are about 0.15 g and the time intervals between increments varies from about 8.4 s (3 basic time intervals) to 36.4 s (13 basic time intervals). These weight increase increments are the blobs of water that are intermittently being transferred from the funnel-like element 16 to the collection container 32 situated on weighing pan 36 of balance 34.

A 0.15 g weight corresponds to an approximate blob size of a 6.59 mm diameter spherical drop or to a collection of approximately 15 drops of the size that corresponds to the minimum weight resolution of the present invention. A rate determination utilizing two blobs infers that a significant number of drops, approximately 30 or more, are being considered in the analysis. To handle data of this type in the rain rate regime smaller than approximately 3 mm hr$^{-1}$, the simplest analytical approach to maintain optimum time resolution is to determine the mass increment increase of each blob, $m_b$, and to divide this by the time interval, $t_b$, between blobs. The rainrate for this spacing interval, at the midpoint of the interval, is then directly related to $$R = C m_b / t_b,$$

where C is the constant that depends on the collection area of the funnel-like element 16. The increments $m_b$ and $t_b$ are indicated in FIG. 4 of the drawing. The choice of peak to peak spacing for $t_b$ is due in part for the convenience of computer programming and calculations.

The rain rates deduced from the data of FIG. 4 are shown in the graph of FIG. 5. The point values portrayed have a weight accuracy of 0.01 g (or a rainrate accuracy of 0.5 mm hr$^{-1}$ at time resolutions accurate to 8.4 s, for the maximum rate shown, to 36.4 s, for the minimum shown. These accuracies are about a factor of seventy better than those of conventional tipping bucket gauges of the past.

Figure 6:
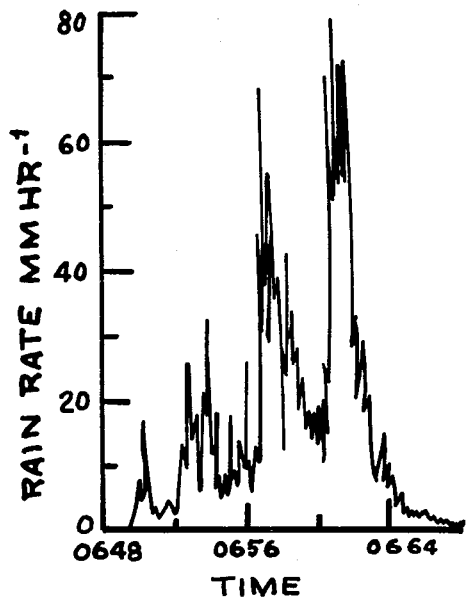
FIG. 6 is a graph representive of rain rate versus time in heavy and very heavy rain rate situations.

In contrast to the above situation of very light rain rates, the situation for heavy and very heavy rain rates, greater than approximately 9 hr mm$^{-1}$, is illustrated in FIG. 6 of the drawing. In this situation, the sides of the funnel-like element 16 are wetted and the blobs of water flowing out of port 26 into the collection container 32 overlap to yield a continuous water flow within which the contributions of any individual blob can no longer be sensibly detected. For this continuous flow, the electronic balance 34 records mass increases for each interval of its basic resolution time. The rain rates determined therefore have a time resolution of 2.8 s.

In this heavy and very heavy rain rate regime, the rain rate meter 10 of this invention will surpass a conventional tipping bucket gauge for rain rates up to about 200 mm hr$^{-1}$. For rain rates greater than 700 mm$^{-1}$, the present invention far surpasses gauges of the past wherein water spillage between bucket trips begins to be a major problem for the tipping bucket gauge and, at about 1000 mm hr$^{-1}$, the tipping bucket fails completely and 100% spillage occurs or the bucket merely fibrilates without tipping. The rain rate meter 10 of this invention does not suffer from such problems and can be used to measure rain rate at 2.8 s resolution up to rates of about 2000 mm hr$^{-1}$. The 2.8 s time resolution of the present invention, however, is not a fundamental limitation, but merely the update time of the balance 34. The time resolution of the electromagnetic restoration unit, which is the sensor of the balance, is much faster, perhaps as fast as 0.001 s. An electronic rework of the balance could yield a much faster responding rain gauge that could be used, for example, to determine details of rain rate differences along the wind trajectories of rain situations crossing the meter.

Figure 7:
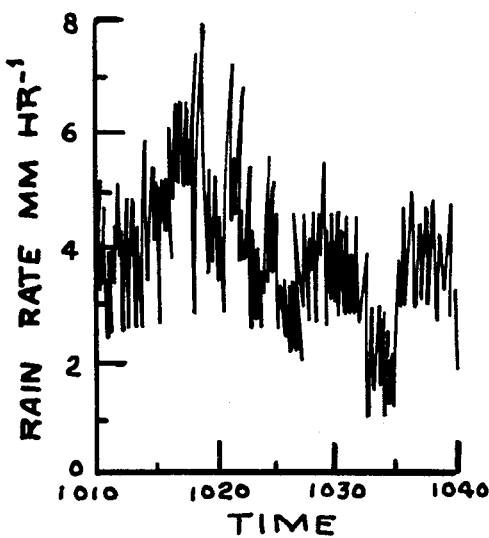
FIG. 7 is a graph representive of rain rate at medium rainfall situations.

In the intermediate rain rate regime between about 3 to 9 mm hr$^{-1}$, the situation exists where the sides 17 of funnel-like element 16 are not fully wetted. The blobs, in this case, are falling into the collection container 32 in each adjacent time interval as individual entities or as partially overlapped aggregates of blobs. Weight differences over the basic 2.8 s time intervals thus display considerable variation and result in erratic rain rates as shown in FIG. 7 of the drawing.

Figure 8:
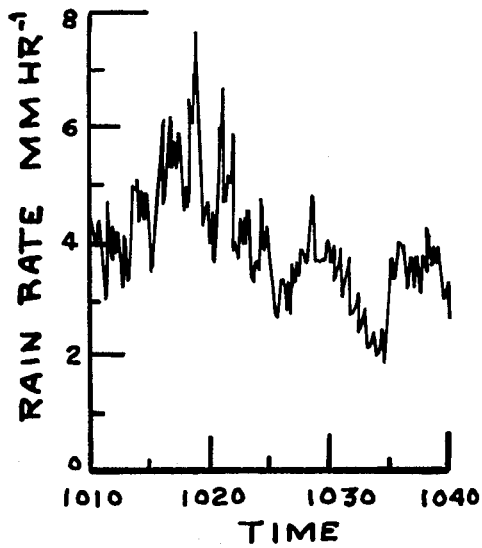
FIG. 8 is graphic representation of rain rate information that utilizes the basic graphic representations of FIG. 7.

Since it can be reasoned that an increase in mean drop size most likely occurs with increasing rain rate, it can then be postulated that a blob in this region consists of approximately 5 to 10 drops. A representative number for analysis would then be contained in approximately 4 blobs or a corresponding weight increase of 0.6 g. In this region from about 3 to 9 mm hr$^{-1}$, weight increase of 0.6 g occur between 2 and 4 time increments or in 5.6 to 11.2 s. FIG. 8 is an example of the rain rates that result from using the basic data of FIG. 7 in an analysis that requires weight increases of greater than 0.6 in variable time increments of 5.6 to 11.2 s.

Although this invention has been described with reference to particular embodiments, it will be understood that this invention is also capable of further and other embodiments within the spirit and scope of the appended claims.

We claim:

1. A rain rate meter comprising:

a housing having an open top for surface for receiving rainfall, said top surface having a funnel-shaped rain directing element therein, and said funnel-shaped element having an outlet port centrally located at the bottom thereof;

dispersing means located within said housing and positioned adjacent the exterior of said outlet port of said funnel-shaped element for intersecting rain water flowing from said outlet port in order to substantially eliminate the adverse effects of the downward momentum of said flowing rain water;

means located within said housing adjacent said outlet port for collecting said falling rain water;

means situated within said rain water collecting means adjacent said dispersing means for receiving said falling rain water and depositing said falling rain water in a gentle and gradual manner into said collecting means; and means operably connected to said collecting means for monitoring the weight of said collected rain water over a preselected period of time;

whereby accurate determinations of collected rainfall weight and rainfall rate can be accurately made.

2. A rain rate meter as defined in claim 1 wherein said dispersing means comprises a flat plate fixedly secured to said funnel-shaped element and spaced a small distance apart from said outlet port.

3. A rain rate meter as defined in claim 1 wherein said rain receiving and depositing means comprises a plurality of spaced apart discs, said discs being supported in said collecting means by an upstanding rod.

4. A rain rate meter as defined in claim 3 wherein said dispersing means comprises a flat plate fixedly secured to said funnel-shaped element and spaced a small distance apart from said outlet port.

5. A rain rate meter as defined in claim 3 wherein said discs have diameters of increasing size in direct relationship from the distance of said discs from said dispersing means.

6. A rain rate meter as defined in claim 5 wherein said rain receiving and depositing means has an overall conical configuration.

7. A rain rate meter as defined in claim 5 wherein said dispersing means comprises a flat plate fixedly secured to said funnel-shaped element and spaced a small distance apart from said outlet port.

8. A rain rate meter as defined claim 7 wherein said collecting means has a circular, upstanding rib at the bottom thereof and said receiving and depositing means is situated therein.

9. A rain rate meter as defined in claim 4 wherein said means for monitoring the weight of said collected rain water comprises an electronic balance capable of weighing said rainfall to within approximately 0.01 grams.

10. A rain rate meter as defined in claim 1 wherein said rain receiving and depositing means comprises an upstanding cylindrically-shaped, sponge-like element situated in said collecting means.

11. A rain rate member as defined in claim 10 wherein said dispersing means comprises a flat plate fixedly secured to said funnel-shaped element and spaced a small distance apart from said outlet port.

12. A rain rate meter as defined in claim 11 wherein said means for monitoring the weight of said collected rain water comprises an electronic balance capable of weighing said rainfall to within approximately 0.01 grams.

13. A rain rate meter as defined in claim 4 wherein said housing has an access opening therein whereby said collecting means can be easily removed, and means located adjacent said access opening for selectively closing said access opening.

14. A rain rate meter as defined in claim 11 wherein said housing has an access opening therein whereby said collecting means can be easily removed, and means located adjacent said access opening for selectively closing said access opening.

* * * * *